R. GAHL.
METHOD OF RECOVERING METALS FROM SOLUTION.
APPLICATION FILED AUG. 15, 1917.
1,269,418.
Patented June 11, 1918.
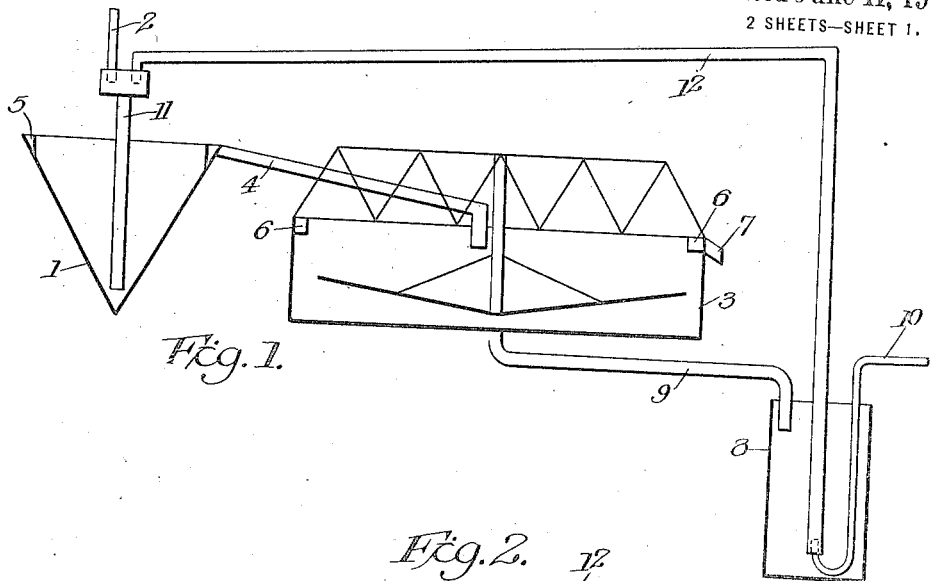
Fig. 1.
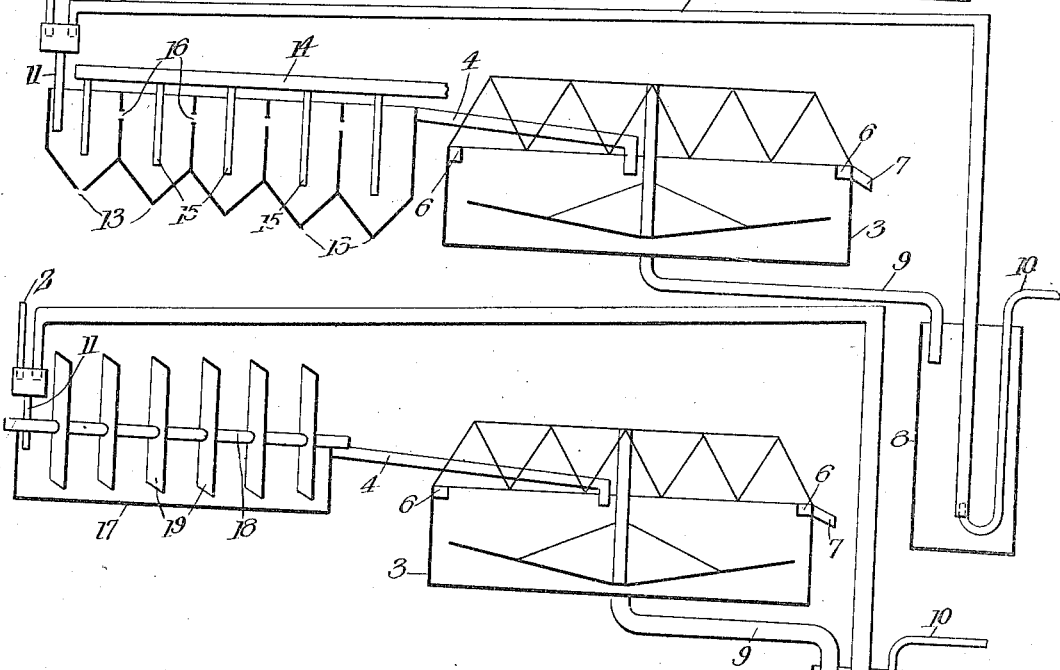
Fig. 2.
Fig. 3.
Witness
G. S. Baker
Inventor,
Rudolf Gahl
By Byrnes Townsend & Buckwalter
Attorneys

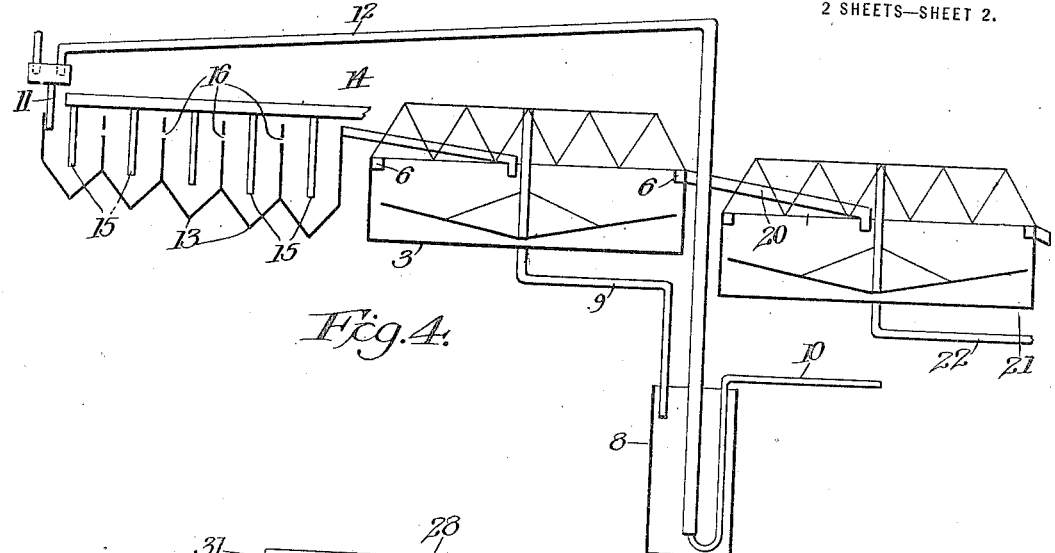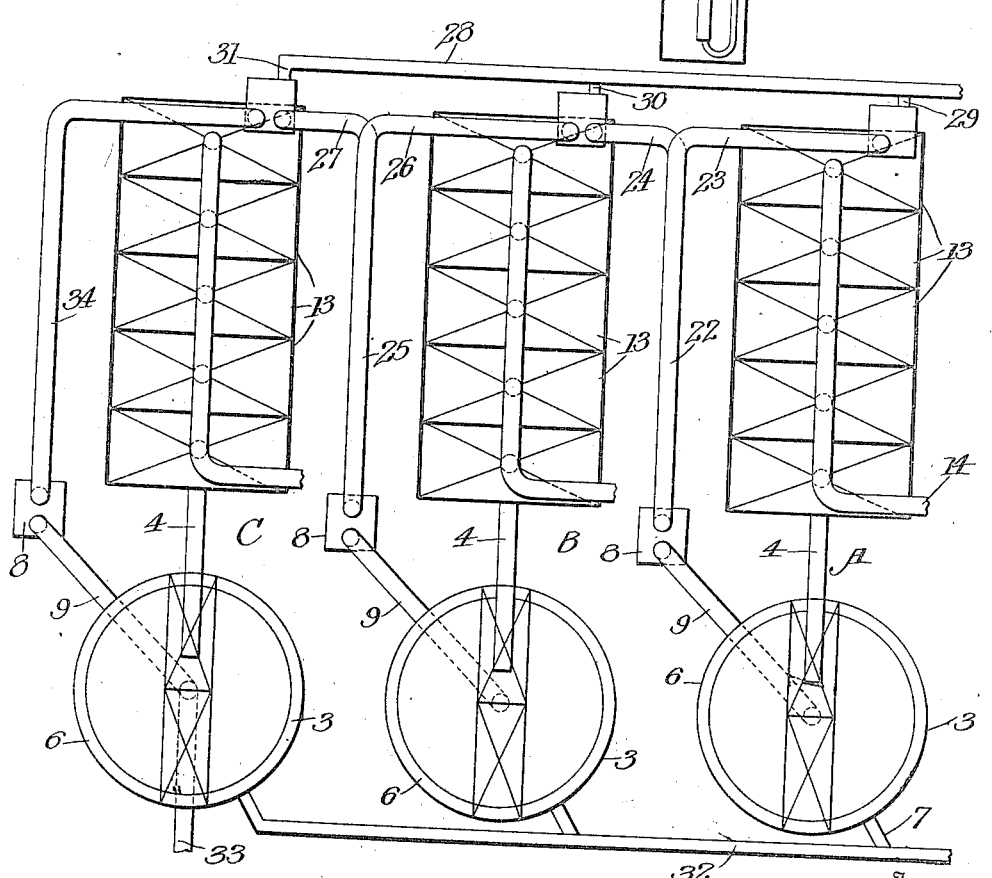

UNITED STATES PATENT OFFICE.

RUDOLF GAHL, OF MIAMI, ARIZONA.

METHOD OF RECOVERING METALS FROM SOLUTION.

1,269,418.  Specification of Letters Patent.  Patented June 11, 1918.

Application filed August 15, 1917.  Serial No. 186,411.

*To all whom it may concern:*

Be it known that I, RUDOLF GAHL, a citizen of the United States, residing at Miami, in the county of Gila and State of Arizona, have invented certain new and useful Improvements in Method of Recovering Metals from Solution, of which the following is a specification.

It is well known that metal-values contained in metal-bearing-solutions, such as mine-waters and solutions resulting from leaching operations, can be precipitated by caustic lime. While the precipitation by caustic lime is advantageous in that the precipitation of the metal-content of the solution is accomplished quickly and completely, it is disadvantageous because the resulting product is of such a slimy nature as to make it extremely difficult to separate it from the excess of water. It is almost impossible to accomplish this by the means known to the art, such as settling-tanks, centrifugal separators or filters. Further, caustic lime has the added disadvantage of being expensive.

Precipitation by crude (unburned) limestone has occasionally been attempted. It recommends itself chiefly because the material can be obtained cheaply in most localities, and because the resulting product does not present the difficulties inherent in the slimy quicklime-precipitate.

When limestone in granular form, preferably of 10 or 20 mesh material, is placed in a tank through which a solution, for example one resulting from leaching copper ores or tailings with sulfuric acid, is allowed to percolate, it will, in the beginning, precipitate metal-values, stopping however, before any appreciable replacement of the limestone has occurred. I have found that the discontinuance of the reaction is largely due to the cementing together of the limestone-grains by some of the reaction-products which act to impede the circulation and to prevent proper contact between the solution and the limestone grains.

It is the object of this invention to provide a method of and apparatus for recovering metal-values from dilute solution, in which the cementing together of the limestone-precipitant is prevented; this and other improvements later to be described making the displacement of the limestone particles by the metals originally contained in solution commercially possible.

The preferred apparatus for carrying out the operation is shown in the accompanying drawings, in which—

Figure 1 is a side view of a conical agitating-tank in combination with a settling-tank and an air-lift for returning thickened and partly enriched pulp to the agitating-tank;

Fig. 2 is a side view of a modification of the apparatus shown in Fig. 1, a single agitating-tank being replaced by a series of tanks;

Fig. 3 is a side view of another modification of the apparatus shown in Fig. 1, the conical agitating-tank being replaced by a launder-shaped agitating-tank;

Fig. 4 is a side view of a series of agitating-tanks in combination with two settling-tanks and an air-lift for returning the thickened pulp from the first settling-tank to the agitating-tanks.

Fig. 5 is a plan view of several units operating in parallel of the form of apparatus shown in Fig. 2.

As shown in Fig. 1, the apparatus comprises an agitating-tank 1, having an overflow 5, conduits 2 and 11 for supplying metal-bearing solution to the agitating-tank 1, a settling-tank 3 having an overflow 6 and an overflow outlet 7, a conduit 4 for conveying solution containing metal-bearing limestone from overflow 5 to settling-tank 3, a pulp-tank 8, a conduit 9 for conveying thickened and partly enriched pulp from settling-tank 3 to pulp-tank 8, an air-supply-pipe 10 and a return pulp-conduit 12.

The operation as carried out in this form of the apparatus is as follows:

Metal-bearing solution is introduced through conduits 2 and 11 into agitating-tank 1 containing limestone particles in suspension in an amount very materially exceeding the quantity theoretically required for the precipitation of the metal-values in solution. The solution enters the tank under suitable pressure depending on the elevation of the upper end of conduit 11. The contact of the solution with the limestone effects the precipitation of the metal-values. The cementing of the limestone is prevented, and the replacement of the limestone made to continue for a much longer time than has formerly been the case by keeping the limestone-particles agitated, by the use of a large excess of limestone and by applying the limestone in the form of a thick pulp. The agitation of the limestone particles is accomplished by causing the metal-bearing solution to flow in an uprising stream through tank 1, choosing its velocity and the size of the limestone grains so as to produce an agitation sufficient to prevent cementing. The depleted metal-bearing-solution, together with a portion of the partly enriched limestone pass into overflow 5 of the agitating-tank 1 and then by the conduit 4 to a settling-tank 3 where the partly enriched limestone settles. The barren solution overflows into overflow 6 of the settling-tank 3 and is conducted away through overflow-outlet 7. The partly enriched limestone flows from the settling-tank 3 through conduit 9 to the pulp-holder 8 from which it is returned through the air-lift conduit 12, supplied with air through pipe 11, to the agitating-tank 1 to be further enriched.

It is possible to operate tank 1 in such a manner that only clear solution will discharge into overflow 5. In that case neither a settling-tank nor a return air-lift would be needed. Experience has shown, however, that the combination of a conical agitating-tank with a settling-tank is preferable.

As shown in Figs. 2 and 3, the apparatus comprises substantially the same elements shown in Fig. 1. In Fig. 2 the conical agitating-tank 1 has been replaced by a series of agitating-tanks 13, having communicating passages 16. Air under suitable-pressure is delivered through conduits 14 and 15 to each tank. In Fig. 3, the conical agitating-tank 1 has been replaced by a launder-shaped tank 17, on which is mounted a revolving shaft 18 having arms 19.

As shown in Fig. 4, the apparatus comprises the same elements shown in Fig. 2 with the addition of a second settling-tank 21, which receives through conduit 20 the overflow from settling-tank 3. Settling-tank 21 is provided with an outlet 22. In this combination, the form of apparatus shown in Figs. 1 and 3 may be substituted for the form shown in Fig. 2.

The operation as carried out in the forms of apparatus shown in Figs. 2 and 3 is substantially the same as in the form shown in Fig. 1. In Fig. 2, the solution together with a portion of the partly enriched limestone, instead of passing through the conical agitating-tank 1, as in Fig. 1, passes through a series of agitating-tanks 13 having communicating passages 16, and flows impoverished in metal-values to the settling-tank 3. Air under suitable pressure is introduced through conduits 14 and 15 into each of agitating-tanks 13 to effect a proper suspension of the limestone. In Fig. 3, the metal-bearing solution and the limestone pass through a launder-shaped tank 17 when an effective suspension of the limestone is produced by a system of arms 19 attached to the revolving shaft 18. In the forms of apparatus shown in Figs. 2 and 3 the operation, after the introduction of the pulp into settling-tank 3, is the same as heretofore described.

The operation of the form of apparatus shown in Fig. 4 is the same as in the form shown in Fig. 2, an additional settling-tank 21 being provided to settle the overflow from settling-tank 3. Experience has shown that when the agitating-tanks 13 and the settling-tank 3 are charged with a certain load of limestone, the overflow from settling-tank 3 contains a large quantity of fine limestone particles. These limestone particles having a higher metal-content than the pulp settling in settling-tank 3 and which is returned through conduit 12 to the agitating-tanks 13 for further enrichment, are conveyed through conduit 20 to settling-tank 21 where an efficient settling occurs, the thickened pulp being drawn off through conduit 22. This product which may be drawn off intermittently or continuously has a high enough metal-content to be considered a finished product.

When additional limestone is charged into tanks 13 and 3 carrying the circulating load, some additional fine material overflows into tank 21. However, the coarser particles of limestone do not, as might be expected, accumulate in the agitating-tanks 13 and the settling-tank 3, since they are gradually reduced in size until they are small enough to overflow into settling-tank 21. The decrease in the size of the limestone-particles in the circulating load is probably due to the continuous removal of the precipitate formed on the surfaces of these particles, this precipitate being of such a delicate nature as to be easily rubbed off in the form of small particles from the limestone.

As shown in Fig. 5, the apparatus comprises three units A, B and C of the form shown in Fig. 2, operating in parallel. In this arrangement the metal-bearing-solution entering through conduit 28 is split into three parts, each portion entering one of the units, A, B and C, through conduits 29, 30 and 31 respectively. Fresh limestone is introduced into unit A and is partly enriched by circulating through this unit after which it passes into settling-tank 3 of the unit A. Instead of returning the enriched limestone to the agitating-tanks 13 of unit A, part or all of it is pumped either continuously or intermittently through conduits 23' and 24 into unit B. When the enriched limestone is returned to the agitating-tanks 13 of unit A, it passes through conduits 23' and 23. The enriched limestone which is passed from unit A into unit B precipitates metal-values from the solution entering unit B and is further enriched by circulating in the same. Part of the enriched limestone of unit B passes to settling-tank 3 of unit B and is conveyed through conduits 25 and 27 to agitating-tanks 13 of unit C, where by further contact with the solution its metal-content is increased to the desired metal-value. The pulp then passes to settling-tank 3 of unit C and is drawn off through conduit 33 or returned through conduit 34 to agitating-tanks 13 of unit C for further treatment.

If it is desired to return the crushed limestone settled in settling-tank 3 of unit B to agitating-tanks 13 of unit B, the pulp passes through conduits 25 and 26. The overflow from settling-tanks 3 of units A, B and C is conducted away through the common overflow-conduit 32.

It is obvious that several units of the form of apparatus shown in Figs. 1, 2, 3 and 4 can be operated in series, parallel or other combination, without departing from the spirit of this invention.

The fineness to which limestone used in this process is to be crushed is determined by the amount of and the time allowed for the desired enrichment. Tests with a copper solution containing approximately .09% copper resulting from the leaching of tailings show that grains as coarse as 48 mesh require about one week to be enriched to a copper-content of 15%, while grains as fine as 200 mesh were enriched to the same point in two days. A conical precipitating tank was used in the above tests. The rate of flow at which it was found that only a very little limestone was carried over into the settling-tank, was .07 cubic feet per minute per square foot of level-surface which the metal-solution assumed in the agitating-tanks.

The solution overflowing from the settling-tank was found to contain very little copper. In these tests the ingoing metal-solution contained also considerable ferric and ferrous iron, while the barren outgoing solution was practically free from iron.

The amount of limestone used in this process is generally several thousand times the quantity theoretically required for the precipitation of the metal values in solution. The exposure of such a large limestone surface to the solution produces a replacement of the limestone even when the rate of replacement in the individual limestone particle has been very considerably reduced, due to the formation of a coating on the limestone-particles themselves.

Experiments have shown that if an amount of limestone equal to ten times the theoretical requirements of a solution is mixed with a metal-bearing solution and kept in agitation, a rather rapid precipitation of the values takes place at first, which ceases after a time, due to the coating of the limestone surfaces with metal values. If however, an inert solid substance, such as finely divided quartz is added to the limestone suspended in solution in such an amount as to materially thicken the pulp, the precipitation does not cease but proceeds further. This is attributable to the greater proximity of the solid particles in suspension, which necessarily brings them into more frequent contact, probably causing a rubbing off of the metal-coating on the limestone particles so as to constantly expose new surfaces.

The same results may be accomplished by replacing the suspended quartz with particles of limestone, or in other words by thickening the limestone suspension i. e. by increasing the percentage of solid limestone in the suspension. The precipitation of the metal-values from the solution does not cease then, that is when the limestone has a low metal-content but proceeds further.

For this reason it is preferred that the suspended limestone as well as the limestone returned for further enrichment, together with the incoming solution should have a rather thick consistency. The relation of the solution to the suspended limestone may advantageously be as about five to one in order to expose a large limestone surface to the action of the metal-bearing solution and to bring the suspended limestone particles into close proximity.

Ordinarily the agitating-tank is operated continuously as far as the solution is concerned but intermittently as regards the limestone, that is the agitating-tank is charged with fresh limestone from time to time, which stays there until its metal content is high enough to justify removal. The process may also be carried on continuously as regards the limestone by preferably feeding the limestone with the inflowing solution in such an amount as to equal that washed over into the settling-tank.

This process was applied to a solution produced by leaching tailings with sulfuric acid and having the following composition:

Cu_____ 323.0 milligrams per liter.
Fe_____ 167.4 " " "
CaO____ 521.0 " " "
MgO ___ 66.5 " " "
$SiO_2$ ___ 67.0 " " "
$Al_2O_3$___ 53.0 " " "
S_____ 1774.0
Free $H_2SO_4$__ 180.4

The precipitate formed in the limestone-tank assayed as follows:

Cu_____ 10.29%
Fe_____ 8.0 %
CaO_____ 14.8 %
MgO_____ 1.1 %
$SiO_2$ _____ 17.4 %
$Al_2O_3$ _____ 8.9 %
S_____ 2.5 %

This process can be used not only for precipitating the metal content of mine-waters and solutions resulting from leaching operations, but also for the reclamation of iron from soutions containing ferrous sulfate originating from the treatment of copper solutions with metallic iron.

The limestone precipitate may be smelted directly or leached with ammonia and ammonium salts, the resulting compound being distilled so as to eliminate the ammonia and produce copper oxid or the limestone precipitates may be leached with sulfuric acid and the sulfate solution treated with iron or electrolyzed to produce copper.

I am aware that limestone has been suggested as a reagent for the precipitation of ferric iron, but so far as I am informed, it has not heretofore been possible to utilize this reagent for the precipitation of copper and ferrous iron from their sulfate solutions at ordinary temperatures. In fact, limestone has been suggested as a reagent for accomplishing a separation between ferric iron on the one hand and ferrous iron and copper on the other.

I claim:

1. The hereindescribed process of recovering metal-values from dilute solution, which consists in maintaining particles of limestone in suspension in said solution until the values are precipitated, the limestone greatly in excess of the proportion theoretically required, and thereafter treating the precipitate to recover the values therefrom.

2. The hereindescribed process of recovering metal-values from dilute solution, which consists in maintaining particles of limestone in suspension in said solution until the values are precipitated, separating the enriched lime-stone into richer and poorer portions, re-treating the poorer portion with solution, and recovering the values from the precipitate.

3. The hereindescribed process of recovering metal-values from dilute solution, which consists in maintaining a large excess of particles of limestone in suspension in said solution until the values are precipitated, separating the enriched limestone into richer and poorer portions, retreating the poorer portion with solution, and recovering the values from the precipitate.

4. The hereindescribed process of recovering copper and ferrous iron from sulfate solution, which consists in maintaining particles of limestone in suspension in said solution, the limestone greatly in excess of the proportion theoretically required, and thereafter treating the precipitate to recover the values therefrom.

In testimony whereof I affix my signature in presence of two witnesses.

RUDOLF GAHL.

Witnesses:
L. C. LOWELL,
E. C. CAPPS.